(12) United States Patent
Flynt

(10) Patent No.: US 7,490,003 B2
(45) Date of Patent: Feb. 10, 2009

(54) SYSTEM AND METHOD FOR PROVIDING A LOCATION SNAPSHOT SERVICE AND ASSOCIATING A SNAPSHOT WITH LOCATION CONTAINER DATA

(75) Inventor: David W. Flynt, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/108,926

(22) Filed: Apr. 18, 2005

(65) Prior Publication Data

US 2006/0235605 A1    Oct. 19, 2006

(51) Int. Cl.
*H04Q 7/20* (2006.01)
*G01C 21/00* (2006.01)

(52) U.S. Cl. ............... 701/200; 701/207; 455/414.2; 455/456.3

(58) Field of Classification Search ........... 701/207, 701/200, 208, 211; 355/414.2, 456.1, 456.3; 709/241
See application file for complete search history.

(56) References Cited

U.S. PATENT DOCUMENTS

| | | | | |
|---|---|---|---|---|
| 5,778,304 A | * | 7/1998 | Grube et al. | 455/456.4 |
| 6,051,088 A | * | 4/2000 | Muckle et al. | 156/82 |
| 6,933,841 B2 | * | 8/2005 | Muramatsu et al. | 340/539.13 |
| 7,039,591 B2 | * | 5/2006 | Ecklund et al. | 705/1 |
| 7,289,812 B1 | * | 10/2007 | Roberts et al. | 455/456.1 |
| 7,305,244 B2 | * | 12/2007 | Blomqvist et al. | 455/456.5 |
| 7,308,356 B2 | * | 12/2007 | Melaku et al. | 701/200 |
| 2001/0044310 A1 | * | 11/2001 | Lincke | 455/456 |
| 2004/0110515 A1 | * | 6/2004 | Blumberg et al. | 455/456.1 |

* cited by examiner

*Primary Examiner*—Tan Q Nguyen
(74) *Attorney, Agent, or Firm*—Merchant & Gould; Ryan T. Grace

(57) ABSTRACT

A system and method for providing a location snapshot service and associating a snapshot with location container data. The system includes a snapshot service for detecting the position of the computing device. The position of the computing device is associated with a street address. The street address is an identifier for a location container. The location container may be associated with internal data that is associated with the street address. The location container may also be associated with external network data that is associated with the street address. In this manner, a computing device may optimize the use of position data to increase computing functionality and applications on a computing device.

20 Claims, 6 Drawing Sheets

SYSTEM AND METHOD FOR PROVIDING A LOCATION SNAPSHOT SERVICE AND ASSOCIATING A SNAPSHOT WITH LOCATION CONTAINER DATA

BACKGROUND OF THE INVENTION

Cellular telephones, personal computers, stationary computers, mobile computers, and other computing devices are fast becoming mainstream modes for personal enjoyment, communication, and data manipulation. As mobile technologies have progressed, mobile devices are being used for far more than mere communication. However, notwithstanding advancements in mobile technology, current mobile technologies are lagging in positioning services apart from 911-emergency services. Moreover, current mobile technologies do not provide any manner of utilizing positioning data for computing functionality or associating positioning data with other core and shell-level applications on the mobile device.

SUMMARY OF THE INVENTION

Aspects of the present invention include optimizing the use of position data to increase computing functionality and applications on a computing device. Aspects may include receiving position data from a location service upon actuation of a location snapshot service. Position data may be correlated to a geographic street address or a plurality of geographic street addresses within a range of the position data. Other aspects include using the geographic street address as a location container or identifier for associated data and other applications. A user may internally associate data with the location container. For example, a geographic street address may be associated with another application on the computing device. The geographic street address may be associated with a scheduler application, messaging application, picture application, contacts application, word processing application, spreadsheet application, money application, accounting application, tip application, banking application, or any other application on the computing device that may use the geographic street address to increase the functionality of the computing device. Stated another way, the location container may store position data and make the position data accessible to other applications on the computing device for further use or integration. A user may also associate external data with the position data. Stated another way, the geographic street address may be associated with data on a network. The data on the network may then be associated with another application on the computing device. A location snapshot may be stored for later access at the user's convenience or a snapshot may be accessed when the user returns to the same geographic location as the snapshot.

Still other aspects of the present invention include a computing device in communication with a location service. The computing device receives position data from the location service. Still other aspects include an actuator configured to actuate a location snapshot service. Upon actuation, the location snapshot service takes a snapshot of the position data. Stated another way, the location snapshot service takes a snapshot of the position of the computing device at a moment in time. In another aspect, the position data is associated with a street address.

Address data may be associated with a location container. The location container may include a database or storage that is identified and/or associated to a particular address. For example, a computing device may include a location container that is associated with a user's home address. In this manner, position data identifies the location container.

The location container may have data associated therewith. Aspects may include an internal module and an external module. The internal module may include internally stored data such as position data, pictures associated with the position data, contacts associated with the position data, scheduler events associated with the position data, etc. Other aspects include associating the internal module with a scheduler application, messaging application, picture application, contacts application, word processing application, spreadsheet application, money application, accounting application, tip application, banking application, or any other application on the computing device that may use the geographic street address to increase the functionality of the computing device. The external module may include associated external data. The address that is associated with the location container may be an identifier and/or link to a network service. The network service may include data associated with the address. Similar to the internal module, data associated with the external module may be associated with a scheduler application, picture application, contacts application, word processing application, spreadsheet application, money application, accounting application, tip application, banking application, or any other application on the computing device that may use the geographic street address to increase the functionality of the computing device. In this manner, the present invention provides an efficient manner of taking a snapshot of position data, identifying a geographic location, associating data with the geographic location, making position data accessible to other applications on the computing device, and accessing data associated with the geographic location.

These and other aspects of the present invention will be evident in light of the disclosure set forth herein.

DETAILED DESCRIPTION

Figure 1:
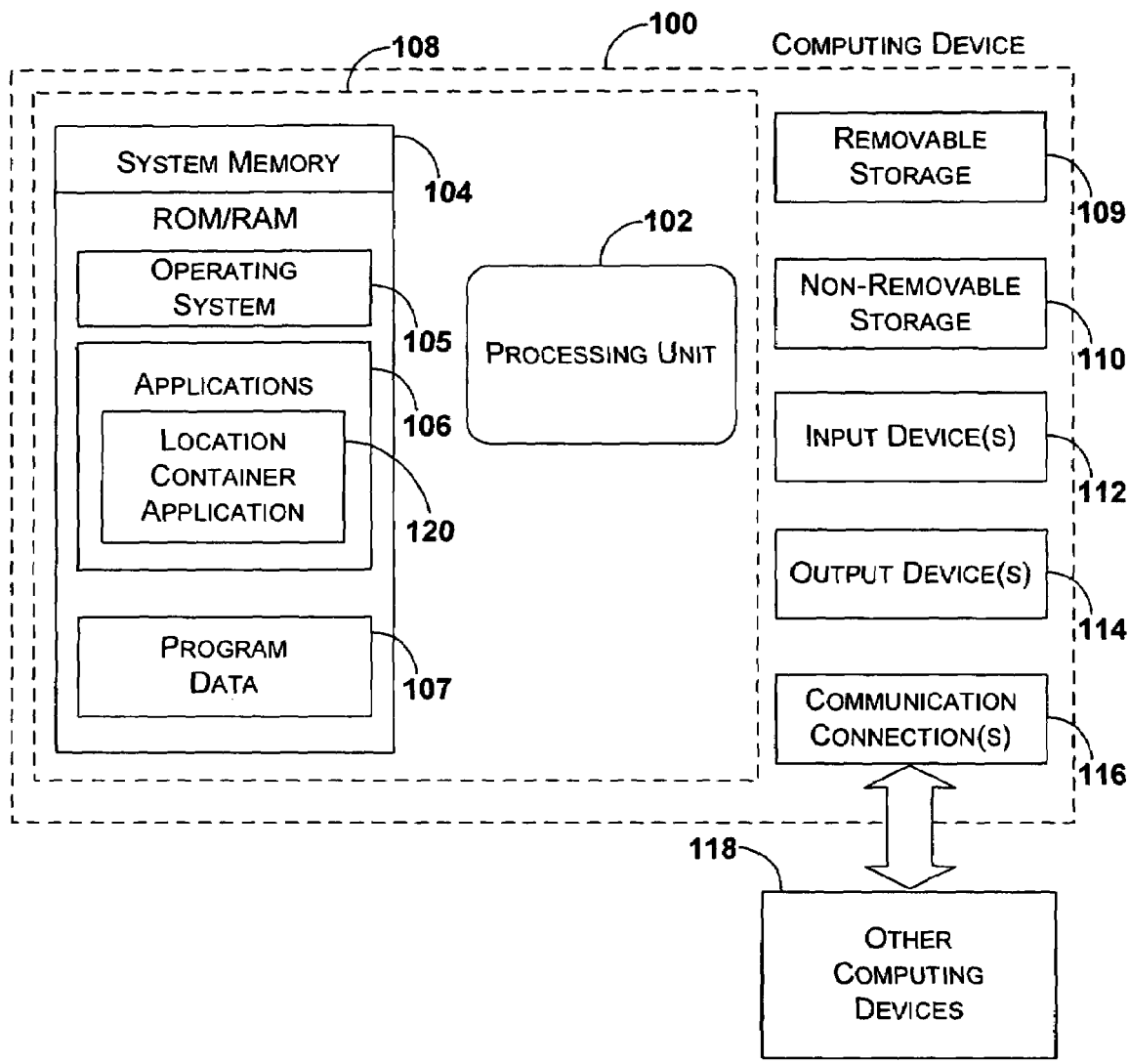
FIG. 1 illustrates an exemplary computing device that may be used in one aspect of the present invention.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure is enabling through embodiments that will convey the full scope of the invention to those of skill in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a System and Method for Providing a Location Snapshot Service and Associating a Snapshot with Location Container Data Succinctly stated, aspects of the present invention include a system and method for providing a location snapshot service and associating a snapshot with location container data. Aspects may include receiving position data from a location service upon actuation of the location snapshot service. Position data may be correlated to a geographic street address or a plurality of geographic street addresses within a range of the position data. Other aspects include using the geographic street address as a location container or identifier for associated data and other applications on the computing device. A user may internally associate data with the location container. Such internally associated data may include maps of the geographic street address, pictures, notes, contacts etc. In other aspects of the present invention a user may make position data accessible to other applications on the computing device for further processing and functionality. A user may also associate external data with the position data. Stated another way, the geographic street address may be associated with data on a network. Such network data may include business information, advertisements, network noting, coupons, etc. The network data may then be associated with other applications on the computing device for further processing and functionality. A location snapshot may be stored for later access at the user's convenience or a snapshot may be accessed when the user returns to the same geographic location as the snapshot. In this manner, a computing device may optimize the use of position data by making position data accessible to other application on the computing device.

As a succinct example of internal functionality of the present invention, a user may drive down a highway and see a location of interest. While driving, the user may actuate a snapshot function on a computing device, which takes a snapshot of the current position of the computing device at that moment in time. An address may be associated with the position data. The address may be associated with a location container so a user may store data in a storage identified by the address. In other aspects the address data is made available to other applications on the computing device. Such applications may include a scheduler application, picture application, contacts application, word processing application, spreadsheet application, or any other application on the computing device that may use the geographic street address to increase the functionality of the computing device. Stated another way, the location container may store position data and make the position data accessible to other applications on the computing device for further use or integration. In this manner, the position of the computing device becomes a variable for all applications associated with the computing device. Such an association increases the functionality, efficiency and usability of applications on the computing device.

As another succinct example of the functionality of the present invention, a user may drive down a highway and see a restaurant of interest. While driving, the user may actuate a snapshot function on a computing device, which takes a snapshot of the current position of the user. Aspects of the invention correlate the snapshot position to an address. This address may be used to find addresses within a range via a network service. The user may scroll the addresses and find the restaurant of interest.

In still another succinct example of the functionality of the present invention, a user may actuate a snapshot function while the user is at home. The snapshot function may generate a location container for the user's home address. The location container may then be used to store family pictures, family data, home data or any other information relevant when the user is at home. In another aspect, the user may associate other family computing devices with the user's computing device. Stated another way, the home location container will include data that indicates when other family computing devices (i.e. mobile phones with a location snapshot service) are located at the home address. In this manner, whenever the user returns home, data associated with the home address becomes available. This data may include the location of other family mobile devices.

Likewise, in yet another succinct example of the functionality of the present invention, computing device association with an address may be used in any combination. For example, a user may have set up a location container for a bar or pub. The user may have also associated several acquaintances' mobile computing devices with the location container for the pub. Accordingly, when the user enters the pub, the user may open the location container to determine if any of the acquaintances are located at the pub.

In still another succinct example of the functionality of the present invention, a location snapshot service may be used in a commercial manner. For example, a user may enter a retail store and actuate the location snapshot service. The computing device receives position data and associates this position data with an address. The address indicates the retail store where the user is located. The address may be associated with a network service. The service may include the Internet and/or a network service that the retail store provides. The user may then receive sales, coupon and/or other retail information via a service that the retail store provides. The network data may then be associated with other applications on the computing device for further processing and functionality. In this manner, a user may walk through a mall and take location snapshots in front of each store to see what is offered and not be required to enter the store.

The retail example may also be implemented with a restaurant. For example, a user may be near a restaurant and actuate the location snapshot service. The computing device receives position data and associates this position data with an address. The address indicates the restaurant where the user is located. The address may be associated with a network service. The service may include the Internet and/or a network service that the restaurant provides. In such a manner, the user may view restaurant data such as a menu or hours of operation. In another aspect, the user may enter the restaurant and sit down at a table. Depending on the service provided by the restaurant, the computing device may receive position data that indicates the table where the user is located. The table location may be associated with an appropriate network service that the restaurant provides. In such a manner, the user may order items via the computing device without needing to interact with a waiter or waitress. If the restaurant is also connected to the service, the restaurant will receive the user's order. Likewise, the user may also pay the final bill through such a service. The network data may also be associated with other applications on the computing device for further processing and functionality. For example, the network data may be associated with a money application, accounting application, tip application, banking application, etc. In this manner, the position data may open a wide range of functionality on the computing device.

In yet another succinct example of the functionality of the present invention, a location snapshot service may be used for geographical location noting. For example, a user may enter a place of interest and actuate the location snapshot service. The computing device receives position data and associates this position data with an address. The address indicates the place of interest where the user is located. The user may then take notes, comment and/or generate critiques about the location. These notes, comments or critiques may then be locally stored in a location container for use when the user returns to the same geographic location or desires reviewing the same. In another aspect, these notes, comments and/or critiques may be associated with a location container that is also associated with a network service. The network service may include a noting service associated with the geographic location. In this manner, a user may enter a geographical location and post notes, comment and/or critiques about a location. A user may also enter a geographical location, take a snapshot and receive notes, comments or critiques from prior individuals who have been to the geographical location. Succinctly stated, the present invention provides a manner for "virtual graffiti" associated with an actual position.

The above examples are for exemplary purposes only and not meant to limit the scope of the disclosure herein. The above examples are meant to convey the general concept of the functionality of the present invention. As discussed above, the present invention may include internally associated data that is not associated with an external network, externally associated data that is associated with an external network, or any combination thereof. Aspects of the present invention include associating position data with other applications of the computing device to increase the functionality, efficiency, and usability of the computing device.

Figure 3:
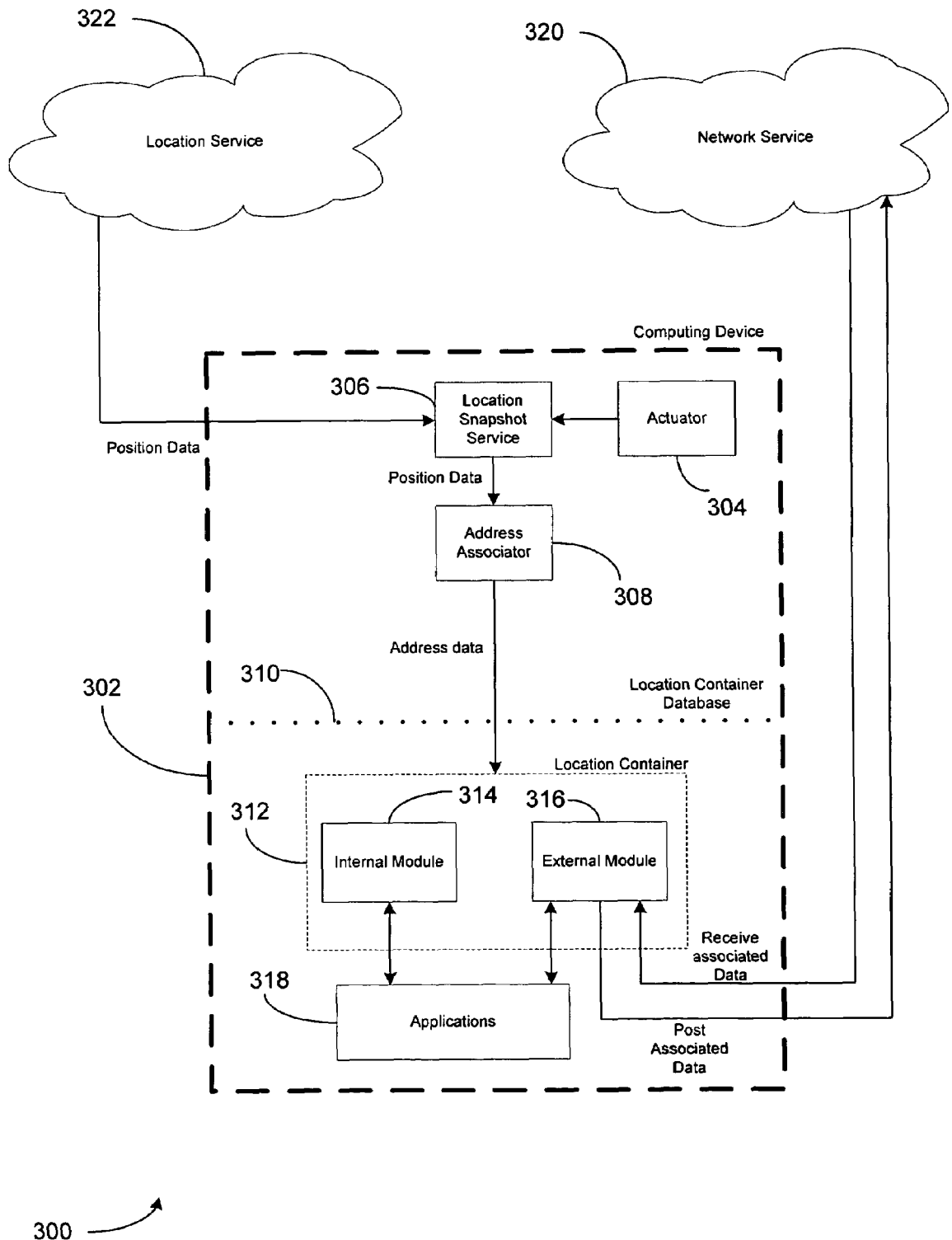
FIG. 3 represents one exemplary modular system that may be used in one embodiment of the present invention.

FIG. 3 represents one exemplary system 300 for providing a location snapshot service and associating a snapshot with location container data. System 300 represents a modular overview of the present invention. System 300 may be integrated as a combination of software and hardware elements, an operating system or any combination thereof. Hardware, databases, software or applications referenced herein may be integrated as a single element or include various elements in communication with one another. Software and/or hardware elements are depicted herein for explanatory purposes only and not for limiting the configuration to multiple elements or a single element performing several functions. For example, in FIG. 3, computing device 302 may include actuator 304, location snapshot service 306, address associator 308, location container database 310, location container 312, internal module 314, external module 316, and applications 318. Reference numbers 304-318 may include separate programs, separate databases and separate hardware. Reference numbers 304-318 may also include a single program or any combination of single and multiple programs. Also, system 300 may be included as one or more elements of an operating system.

Figure 2:
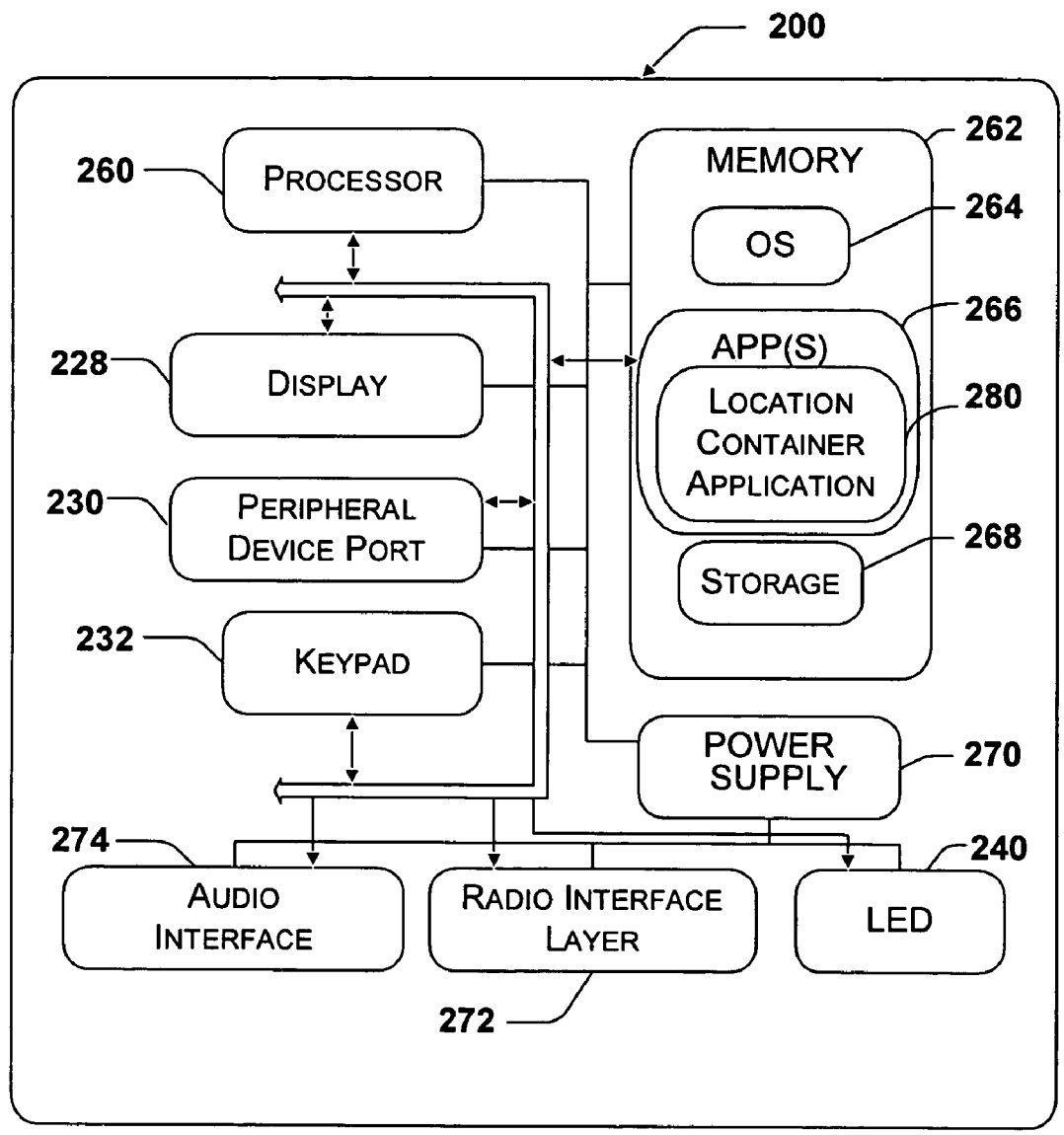
FIG. 2 illustrates an exemplary mobile device that may be used in one aspect of the present invention.

Computing device 302 may include computing device 100 as exemplified in FIG. 1 or computing device 302 may include mobile computing device 200 as exemplified in FIG. 2. Computing device 302 may include a telephone, cellular telephone, satellite telephone, stationary computing device, mobile computing device, televising device, mobile audio device, watch device, or any other device that may implement snapshot services. Computing device 302 may communicate with network service 320 so that the computing device may send and receive information via network service 320. Network service 320 may include a wireless network, cellular network, satellite network, mobile network, Internet network or any other network that facilitates data exchange. In other aspects of the present invention, computing device 302 is not associated with network service 320.

Computing device 302 may also communicate with location service 322. Location service 322 may include a Global Positioning Service ("GPS"), a wireless fidelity service ("Wi-Fi"), a Bluetooth service, a radio service, a triangulation service, a Radio Frequency Identification service ("RFID"), and/or a Service Set Identifier service ("SSID"). In short, location service 322 may include any service capable of aiding computing device 302 in determining a position. The position data may include latitude data, longitude data, address data, street address data, business name data or any other position data that aids in identifying a geographic location. Even though FIG. 3 depicts network service 320 and location service 322 as separate services, services 320 and 322 may be implemented as a single service, dual services, a plurality of services associated with a plurality of functions or any combination thereof. As will be more fully set forth herein, FIG. 3 represents but one exemplary method of communication between location service 322, network service 320 and elements 304-318.

Actuator 304 is configured to actuate location snapshot service 306. In one embodiment, actuator 304 is a hard button on a mobile device. Such a hard button may be used like a camera button to capture a snapshot of position data. For example, a user may drive a vehicle by a mall and press the hard button. The hard button will actuate a location snapshot service. The user may then review information associated with the snapshot as is further discussed herein. Actuator 304 may also include a software actuator and/or a hardware actuator. In other aspects of the invention, actuator 304 includes a dropdown menu and/or a user interface icon. In still other aspects, actuator 304 may include voice recognition software and/or an accelerometer that detects user tapping. In short, actuator 304 may include any type of input that may be used to instigate location snapshot service 306.

Upon actuation, location snapshot service 306 takes a snapshot of position data. The snapshot may include storing position data at a time. The position data may include any type of data that facilitates the determination of a position. In one embodiment, the location snapshot service takes a snapshot of longitude and latitude data associated with the time of actuation. In another embodiment, the geographic location data is a street address. In such a situation, address associator 308 may be bypassed and the received street address may be associated with location container 312.

In one aspect, address associator 308 associates the geographic location data of location snapshot service 306 with a street address. For example, address associator 308 may convert longitude and latitude data of location service 322 into a street address. In other aspects, address associator 308 includes a mapping service that plots the position data on a map. In one embodiment, address associator 308 may be represented by aspects of MICROSOFT MAPPOINT from MICROSOFT CORPORATION, headquartered in Redmond, Wash. In the situation where location service 322 provides a street address, address associator 308 may be bypassed. In other aspects of the invention, address data is not necessary and position data may be associated with location container 312.

Address data may be associated with location container 312 in location container database 310. Location container database 310 may include any type of database or storage associated with computing device 302. Location container database 310 may include a plurality of location containers, wherein each location container is associated with a different address or position.

Location container 312 is a database or storage that is identified and/or associated to a particular address or position. For example, computing device 302 may include a location container that is associated with a user's home address. This location container may be accessible or identified by the home address. In this manner, position data identifies location container 312.

Location container 312 may have data and applications associated therewith. Aspects may include an internal module 314 and an external module 316. Internal module 314 may include internally stored data. Internal module may include data that a user associates with the address. Such data may include pictures, notes, associated computing devices and/or any other data that a user associates with location container 312 and stores on computing device 302. In other aspects, internal module 314 may be associated with applications 318. Applications 318 may include a scheduler application, picture application, contacts application, word processing application, spreadsheet application, money application, accounting application, tip application, banking application, or any other application on the computing device that may use the geographic street address to increase the functionality, efficiency and/or usability of the computing device.

External module 316 may include associated external data. The address that is associated with location container 312 may be an identifier and/or link to network service 320. Network service 320 may include data associated with the address. This data may include any data that is associated with the address and is not stored on computing device 302. Aspects include network data, Internet data, web page data, local area network data, wireless data or any other data that is associated with an address and is stored external to the computing device. The external module 316 may also be associated with applications 318. The network data may be associated with applications 318. Applications 318 may include a scheduler application, picture application, contacts application, word processing application, spreadsheet application, money application, accounting application, tip application, banking application, or any other application on the computing device that may use the geographic street address and/or associated network data to increase the functionality, efficiency and/or usability of the computing device. In this manner, system 300 provides an efficient manner of taking a snapshot of position data, identifying a geographic location, associating data with the geographic location, making position data accessible to other applications on the computing device, and accessing data associated with the geographic location.

Figure 4:
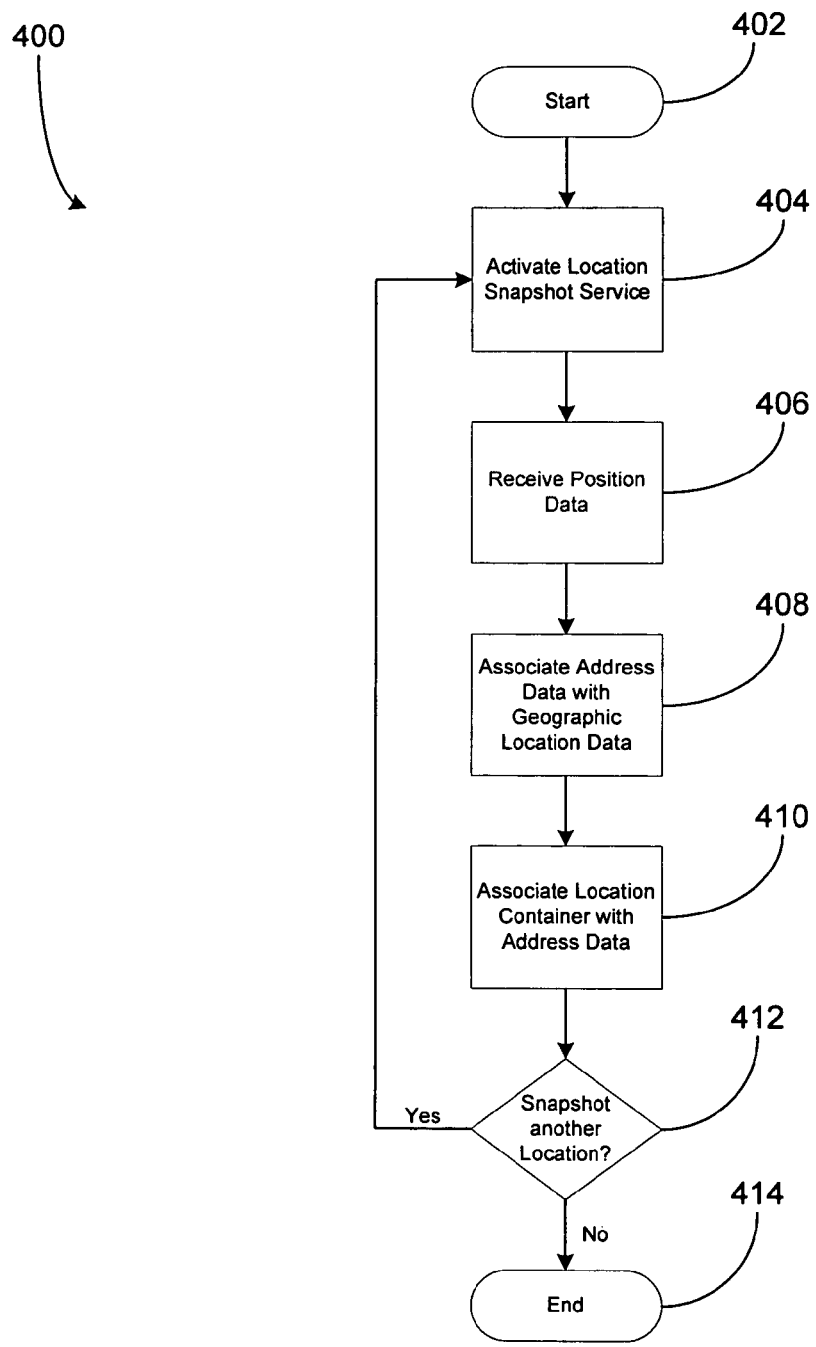
FIG. 4 represents an exemplary logical flow diagram of one embodiment for taking a snapshot of a geographic location.

FIG. 4 represents a logical flow diagram of one embodiment for taking a snapshot of a geographic location. Process 400 starts at starting block 402 and continues to block 404 where the location snapshot service is activated. Activation may include a hard button, software actuator, hardware actuator, dropdown menu, user interface icon, voice recognition actuator, accelerometer actuator, or any other type of input that may be used to instigate a local snapshot service.

At block 406, process 400 receives position data. The position data may include, latitude data, longitude data, address data, street address data, business name data or any other data that aids in identifying a geographic location. Process 400 may then flow to block 408. At block 408, process 400 associates address data with position data. Association may include converting longitude and latitude data into a street address. In other aspects, association includes a mapping service that plots the position data on a map. In the situation where the location service provides a street address, address association may be bypassed.

At block 410, process 400 associates a location container with the address data. The location container may include a database or storage that is identified and/or associated to the particular address. The location container provides a space or volume where data may be associated with the address or data may be accessed by other applications of the computing device.

At block 412, process 400 decides whether to snapshot another location. When a snapshot of another location is implemented, process 400 loops back to block 404 as stated above. Where another snapshot is not implemented, process 400 continues to end block 404 where the snapshot process ends and other processes may continue.

Figure 5:
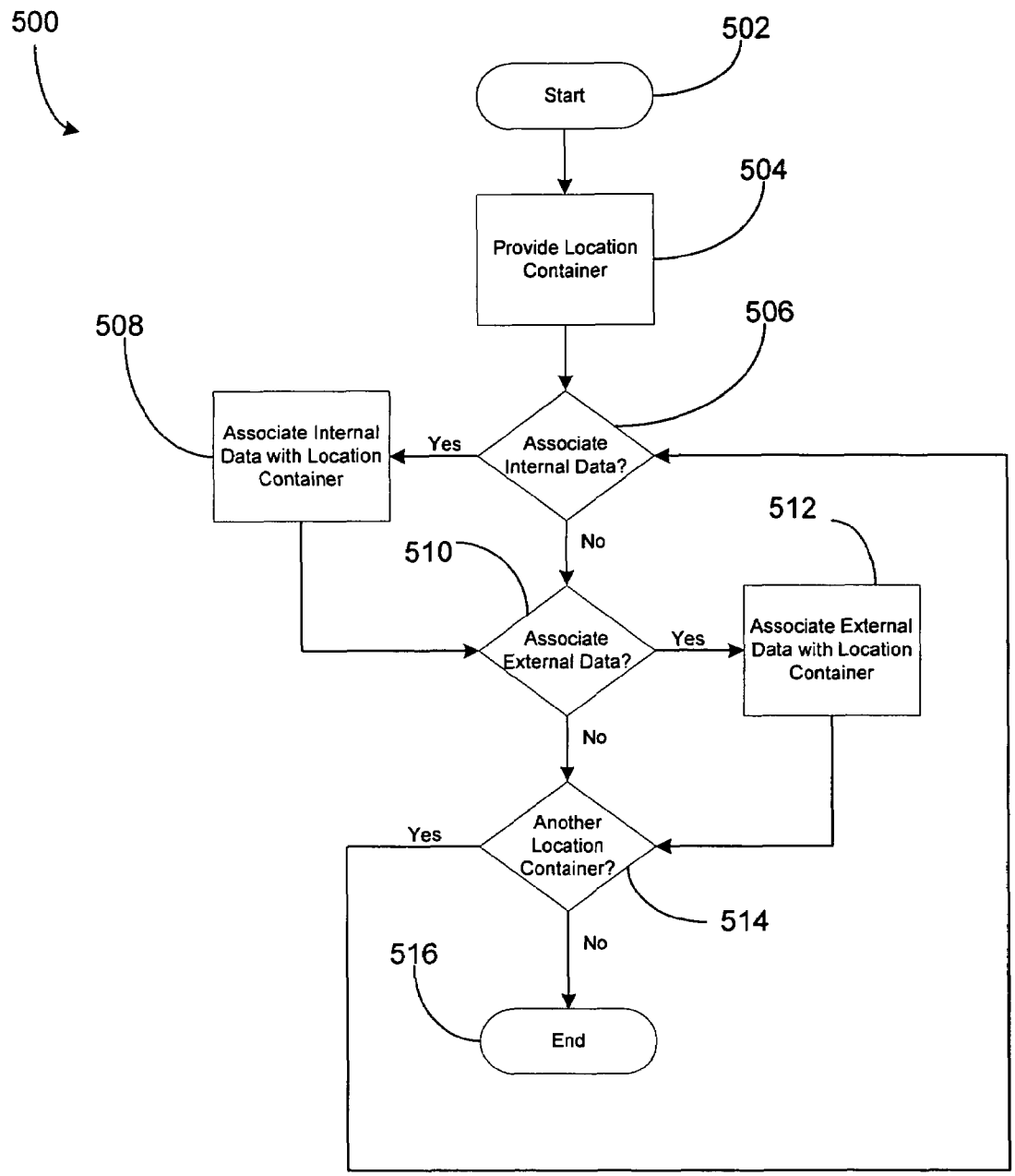
FIG. 5 represents an exemplary logical flow diagram of one embodiment for associating data with a location container.

FIG. 5 represents a logical flow diagram of one embodiment for associating data with a location container. Process 500 starts at starting block 502 and flows to block 504 where a location container is provided. In one aspect, a location container is provided in the manner set forth above in association with FIG. 4.

At block 506, process 500 determines whether to associate internal data with the location container. Aspects may include storing the internal data in an internal database. Such data may include pictures, notes, associated computing devices and/or any other data that a user associates with the location container and stores on the computing device. Other aspects may include associating an internal module with other applications on the computing device. The applications may include a scheduler application, picture application, contacts application, word processing application, spreadsheet application, money application, accounting application, tip application, banking application, or any other application on the computing device that may use data associated with the internal module to increase the functionality, efficiency and/or usability of the computing device. If it is determined that internal data is to be associated with the location container, process 500 flows to block 508 where the internal data is associated with the location container. Process 500 then continues to block 510.

If it is determined that internal data is not to be associated with the location container, process 500 continues to block 510 where process 500 decides whether to associate external data with the location container. The address that is associated with the location container may be an identifier and/or link to a network service. The network service may include data associated with the address. This data may include any data that is associated with the address and is not stored on the computing device. Aspects include network data, Internet data, web page data, local area network data, wireless data or any other data that is associated with an address and is stored external to the computing device. Other aspects may include associating an external module with other applications on the computing device. The applications may include a scheduler application, picture application, contacts application, word processing application, spreadsheet application, money application, accounting application, tip application, banking application, or any other application on the computing device that may use data associated with the external module to increase the functionality, efficiency and/or usability of the computing device. If it is determined that external data is to be associated with the location container, process 500 flows to block 512 where the external data is associated to the location container. Process 500 then continues to block 514.

If it is determined that external data is not to be associated with the location container, process 500 continues to block 514 where process 500 decides whether to associate data with another location container. If yes, process 500 loops back to block 506 as stated above. If no, process 500 continues to end block 516 where the association process ends and other processes may continue.

Figure 6:
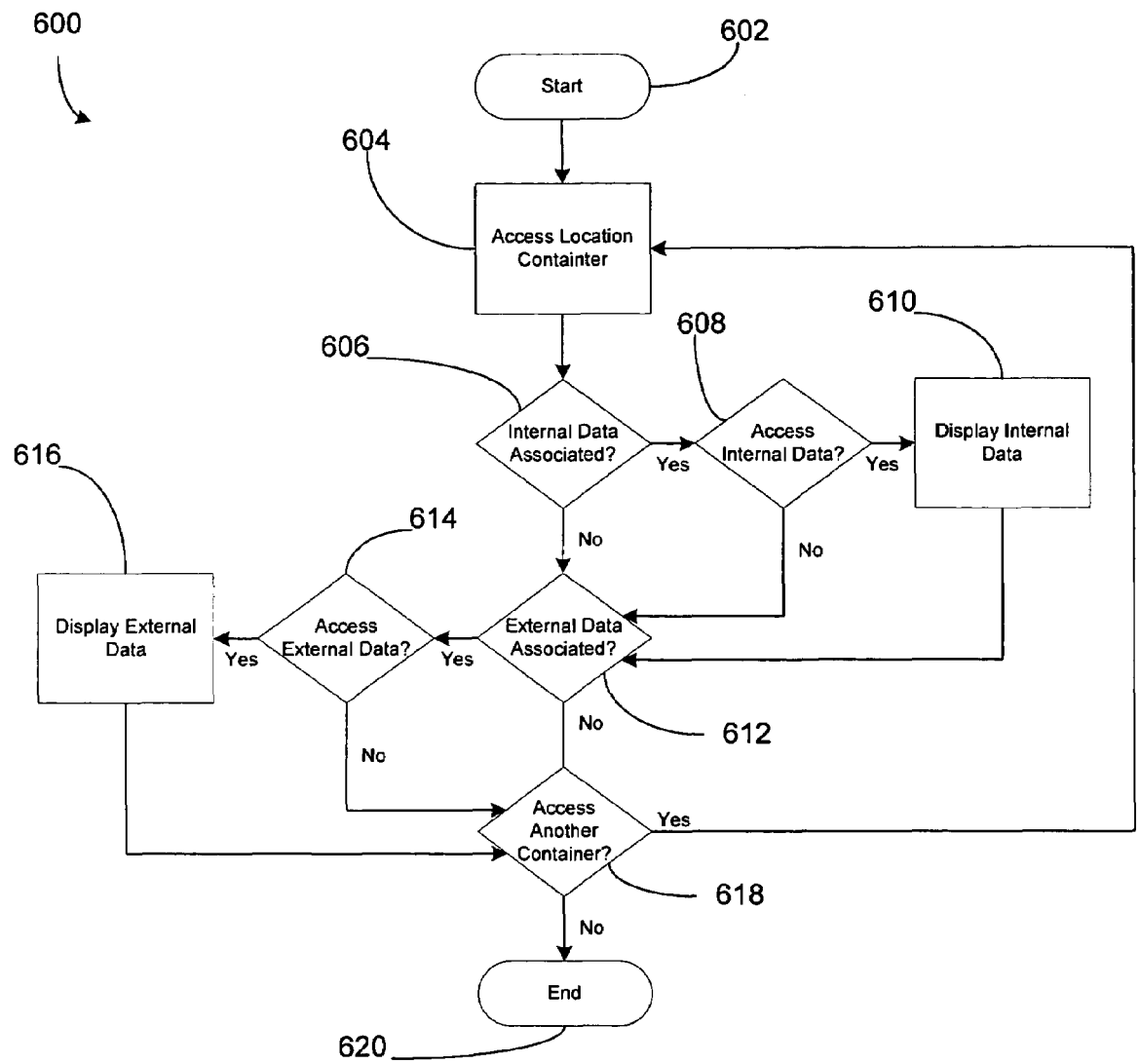
FIG. 6 represents an exemplary logical flow diagram of one embodiment for accessing data associated with a location container.

FIG. 6 represents a logical flow diagram of one embodiment for accessing data associated with a location container. Process 600 starts at starting block 602 and flows to block 604 where a location container is accessed. In one aspect, a location container is provided in the manner set forth above in association with FIG. 4. The location container may be accessed via a location container database. In one aspect, the user selects a location container from a list of available location containers.

At block 606, process 600 determines whether internal data is associated with the location container. Internal data may be associated with the location container in the manner set forth in association with FIG. 5. When internal data is associated with the location container, process 600 flows to block 608 where process 600 decides whether to access the internal data. When the internal data is not accessed, process 600 flows to decision block 612 as set forth below. When the internal data is accessed, process 600 flows to block 610 where the internal data is made accessible and/or displayed on the computing device. The process then flows to decision block 612 as set forth below.

Where internal data is not associated, process 600 flows from block 606 to decision block 612. At block 612, process 600 determines whether external data is associated with the location container. External data may be associated with the location container in the manner set forth in association with FIG. 5. When external data is associated via the location container, process 600 flows to block 614 where process 600 decides whether to access the external data. When the external data is not accessed, process 600 flows to decision block 618 as set forth below. When the external data is accessed, process 600 flows to block 616 where the external data is made accessible and/or displayed on the computing device. The process then flows to decision block 618 as set forth below.

At block 618, process 600 decides whether to access another location container. If yes, process 600 loops back to block 604 as stated above. If no, process 600 continues to end block 620 where the association process ends and other process may continue.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for a location container. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for a location container.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for organizing dynamic communication data by a location container identified by a street address, the method comprising:
   receiving position data on a mobile computing device, where the position data indicates a current location of the mobile computing device;
   resolving the position data into a street address;
   generating a location container;
   associating the street address resolved from the position data with the generated location container, wherein the location container is identified by the street address;
   receiving dynamic communication data associated with a remote computing device, wherein the dynamic communication data is configured to provide two-way communication between the mobile computing device and the remote communication device, wherein the dynamic communication data is identified by the street address; and
   storing the dynamic communication data identified by the street address in generated location container identified by the street address.

2. The computer-implemented method of claim 1, further comprising:
   after storing the dynamic communication data, determining whether the dynamic communication data is currently associated with the street address; and
   removing the dynamic communication data from the generated location container identified by the street address when the dynamic communication data is not currently associated with the street address.

3. The computer-implemented method of claim 2, wherein the dynamic communication data is an identifier of a user associated with the remote communication device, wherein the identifier indicates that the user is currently at the street address.

4. The computer-implemented method of claim 1, wherein receiving dynamic communication data with a remote computing device includes:
   querying the Internet with the street address;
   determining a service associated with the street address; and
   receiving two-way transactional data for generating a transaction between the mobile computing device and the service identified by the street address.

5. The computer-implemented method of claim 4, wherein determining a service associated with the street address includes receiving a list of services on the mobile computing device and receiving a user selection of one of the services in the list.

6. The computer-implemented method of claim 4, wherein the two-way transaction data includes a request for service and a bill for service.

7. The computer-implemented method of claim 6, wherein the two-way transaction data includes a bill-pay service.

8. A computer-readable storage medium having computer executable instructions for organizing dynamic communication data by a location container identified by a street address. the instructions comprising:
   receiving position data on a mobile computing device, where the position data indicates a current location of the mobile computing device;
   resolving the position data into a street address;
   generating a location container;
   associating the street address resolved from the position data with the generated location container, wherein the location container is identified by the street address;
   receiving dynamic identifiers associated with a remote computing device, wherein the dynamic communication data is configured to provide communication between the mobile computing device and the remote communication device, wherein the dynamic communication data is identified by the street address; and
   storing the dynamic communication data identified by the street address in the generated location container identified by the street address.

9. The computer-readable storage medium of claim. 8, further comprising:
   after storing the dynamic communication data, determining whether the dynamic communication data is currently associated with the street address; and
   removing the dynamic communication data from the generated location container identified by the Street address when the dynamic communication data is not currently associated with the street address.

10. The computer-readable storage medium of claim 9, wherein the dynamic communication data is an identifier of a user associated with the remote communication device, wherein the identifier indicates that the user is currently at the street address.

11. The computer-readable storage medium of claim 8, wherein receiving dynamic communication data with a remote computing device includes:
   querying the Internet with the street address;

determining a service associated with the street address; and receiving two-way transactional data for generating a transaction between the mobile computing device and the service identified by the Street address.

12. The computer-readable storage medium of claim 11, wherein determining a service associated with the street address includes receiving a list of services on the mobile computing device and receiving a user selection of one of the services in the list.

13. The computer-readable storage medium of claim 11, wherein the transaction data includes a request for service and a bill for service.

14. The computer-readable storage medium of claim 13, wherein the transaction data includes a bill-pay service.

15. A system for organizing dynamic communication data by a location container identified by a street address, the system comprising:

a processor; and a memory having computer-executable instructions stored thereon, wherein the instructions are configured for:

receiving position data on a mobile computing device, where the position data indicates a current location of the mobile computing device;

resolving the position data into a street address;

generating a location container;

associating the street address resolved from the position data with the generated location container, wherein the location container is identified by the street address;

receiving dynamic communication darn associated with a remote computing device, wherein the dynamic communication data is configured to provide two-way communication between the mobile computing device and the remote communication device, wherein the dynamic communication data is identified by the street address; and storing the dynamic communication data identified by the street address in the generated location container identified by the street address.

16. The system of claim 15, further comprising:

after storing the dynamic communication data, determining whether the dynamic communication data is currently associated with the street address; and removing the dynamic communication data from the generated location container identified by the street address when the dynamic communication data is not currently associated with the street address.

17. The system of claim 16, wherein the dynamic communication data is an identifier of a user associated with the remote communication device, wherein the identifier indicates that the user is currently at the street address.

18. The system of claim 15, wherein receiving dynamic communication data with a remote computing device includes:

querying the Internet with the street address;

determining a service associated with the street address; and receiving two-way transactional data for generating a transaction between the mobile computing device and the service identified by the street address.

19. The system of claim 18, wherein determining a service associated with the street address includes receiving a list of services on the mobile computing device and receiving a user selection of one of the services in the list.

20. The system of claim 18, wherein the two-way transaction data includes a request for service and a bill for service.

* * * * *

UNITED STATES PATENT AND TRADEMARK OFFICE
CERTIFICATE OF CORRECTION

PATENT NO. : 7,490,003 B2  
APPLICATION NO. : 11/108926  
DATED : February 10, 2009  
INVENTOR(S) : David Wayne Flynt Page 1 of 1

It is certified that error appears in the above-identified patent and that said Letters Patent is hereby corrected as shown below:

In column 11, line 61, in Claim 1, after "in" insert -- the --.

In column 12, line 31, in Claim 8, delete "address." and insert -- address, --, therefor.

In column 12, line 50, in Claim 9, delete "claim." and insert -- claim --, therefor.

In column 12, line 56, in Claim 9, delete "Street" and insert -- street --, therefor.

In column 13, line 5, in Claim 11, delete "Street" and insert -- street --, therefor.

In column 13, line 31, in Claim 15, delete "darn" and insert -- data --, therefor.

Signed and Sealed this  
Third Day of May, 2011

David J. Kappos  
*Director of the United States Patent and Trademark Office*